US00RE39656E

(19) United States
(12) Reissued Patent
Park

(10) Patent Number: US RE39,656 E
(45) Date of Reissued Patent: May 29, 2007

(54) APPARATUS AND METHOD FOR PRODUCING METAL FIBER

(76) Inventor: Yang-Za Park, Sanbon-dong, Gunpo-si, Kyungkido, 435-040 (KR)

(21) Appl. No.: 10/851,984

(22) Filed: May 21, 2004

Related U.S. Patent Documents

Reissue of:
(64) Patent No.: 6,622,777
Issued: Sep. 23, 2003
Appl. No.: 10/225,078
Filed: Aug. 22, 2002

U.S. Applications:
(63) Continuation of application No. PCT/KR01/00253, filed on Feb. 21, 2001.

(30) Foreign Application Priority Data

Feb. 22, 2000 (KR) ..... 10-2000-0008414

(51) Int. Cl.
*B22D 11/06* (2006.01)

(52) U.S. Cl. ..... 164/463; 164/423
(58) Field of Classification Search ..... 164/463, 164/423
See application file for complete search history.

(56) References Cited

U.S. PATENT DOCUMENTS 4,124,664 A * 11/1978 Maringer ..... 75/333
4,217,089 A * 8/1980 Kopelman ..... 431/362
4,907,641 A * 3/1990 Gaspar ..... 164/423
5,213,151 A * 5/1993 Hackman ..... 164/453

FOREIGN PATENT DOCUMENTS

JP 10-180422 * 7/1998

* cited by examiner

*Primary Examiner*—Kuang Y. Lin
(74) *Attorney, Agent, or Firm*—Thomas R. Vigil; Welsh & Katz, Ltd.

(57) ABSTRACT

The apparatus and a method are used to produce metal fiber, which can increase production efficiency of metal fiber using a metal plate and simplify manufacturing equipments and includes a controlling device. The method for producing metal fiber includes steps of: making a frame in a vacuum condition by removing the air; vertically inserting an end of a metal plate between the two induction coils arranged horizontally at an interval in the inside of the frame and heating and melting the end of the metal plate with heat generated by the induction coils; gradually moving the metal plate downwardly and bringing the end of the metal plate into contact with blades of a rotary disk, the rotary disk being horizontally mounted at a lower portion of the induction coils in the inside of the frame and rotating in a high speed; and solidifying metal fiber separated by the blades of the rotary disk.

7 Claims, 2 Drawing Sheets

APPARATUS AND METHOD FOR PRODUCING METAL FIBER

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of PCT/KR01/00253 filed Feb. 21, 2001 which claims priority from Korean application No. 2000/0008414 filed Feb. 22, 2000.

BACKGROUND OF THE INVENTION

1. Field of the Invention

The present invention relates to an apparatus and a method for producing metal fiber. More particularly, the present invention relates to a apparatus and a method for producing metal fiber, which can extract fiber by melting a metal plate with an induction coil and then contacting with a bar-type rotary disk.

2. Description of the Prior Art

In general, a metal fiber is used in a filtering system for lubricating oil or refined oil and a filler for conductive plastics. Conventionally, the metal fiber is produced by melting a plurality of metal bars. However, because there is an interval between the metal bars, there are much electric consumption wasted in melting the metal bars by a heating device, and thereby production efficiency of metal fiber to power consumption is lowered. Furthermore, because a device for feeding the plural metal bars is required, it is very complex in structure and is inconvenient in management of the device. In addition, a controlling system for keeping the metal bars in an even temperature or in a uniform speed are required.

BRIEF SUMMARY OF THE INVENTION

It is, therefore, an object of the present invention to provide an apparatus and a method for producing metal fiber, which can increase production efficiency of a metal fiber using a metal plate and simplify equipments and a controlling system.

To achieve the above object, the present invention provides a method for producing metal fiber including the steps of: making a frame in a vacuum condition by removing the air; vertically inserting an end of a metal plate between two induction coils arranged horizontally at an interval in the inside of the frame and heating and melting the end of the metal plate with heat generated by the induction coils; gradually moving the metal plate downwardly and bringing the end of the metal plate into contact with blades of a rotary disk, the rotary dish being horizontally mounted at a lower portion of the induction coils in the inside of the frame and rotating in a high speed; and solidifying metal fiber separated by the blades of the rotary disk.

Furthermore, to achieve the above object, the present invention provides an apparatus for producing metal fiber including: a frame; two induction coils mounted horizontally at an interval in the inside of the frame, each induction coil heating a metal plate dropped vertically between the induction coils; and a rotary disk having a plurality of blades formed on a round bar at regular intervals, the rotary disk being horizontally mounted at a lower portion of the induction coil in the inside of the frame, the rotary disk rotating in a high speed.

BRIEF DESCRIPTION OF THE SEVERAL VIEWS OF THE DRAWINGS

Further objects and advantages of the present invention can be more fully understood from the following detailed description taken in conjunction with the accompanying drawings in which.

DETAILED DESCRIPTION OF THE INVENTION

Figure 1:
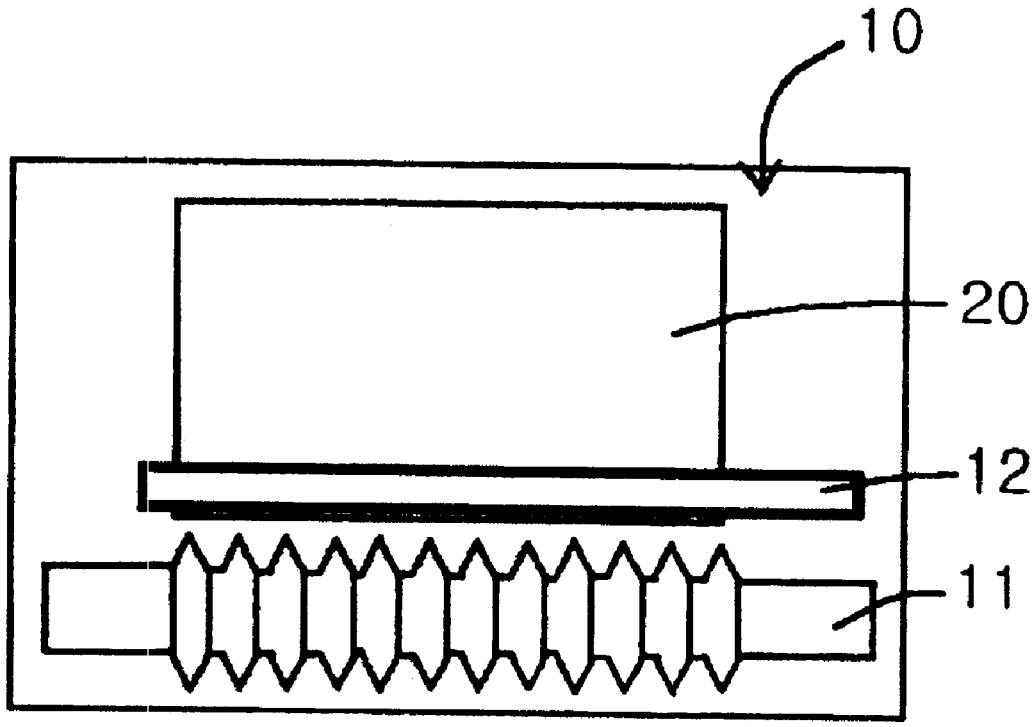
FIG. 1 is a schematic view of a metal fiber producing apparatus according to the preferred embodiment of the present invention.

The present invention will now be described in detail in connection with preferred embodiments with reference to the accompanying drawings. For reference, like reference numerals designate corresponding parts throughout all views.

Figure 2:
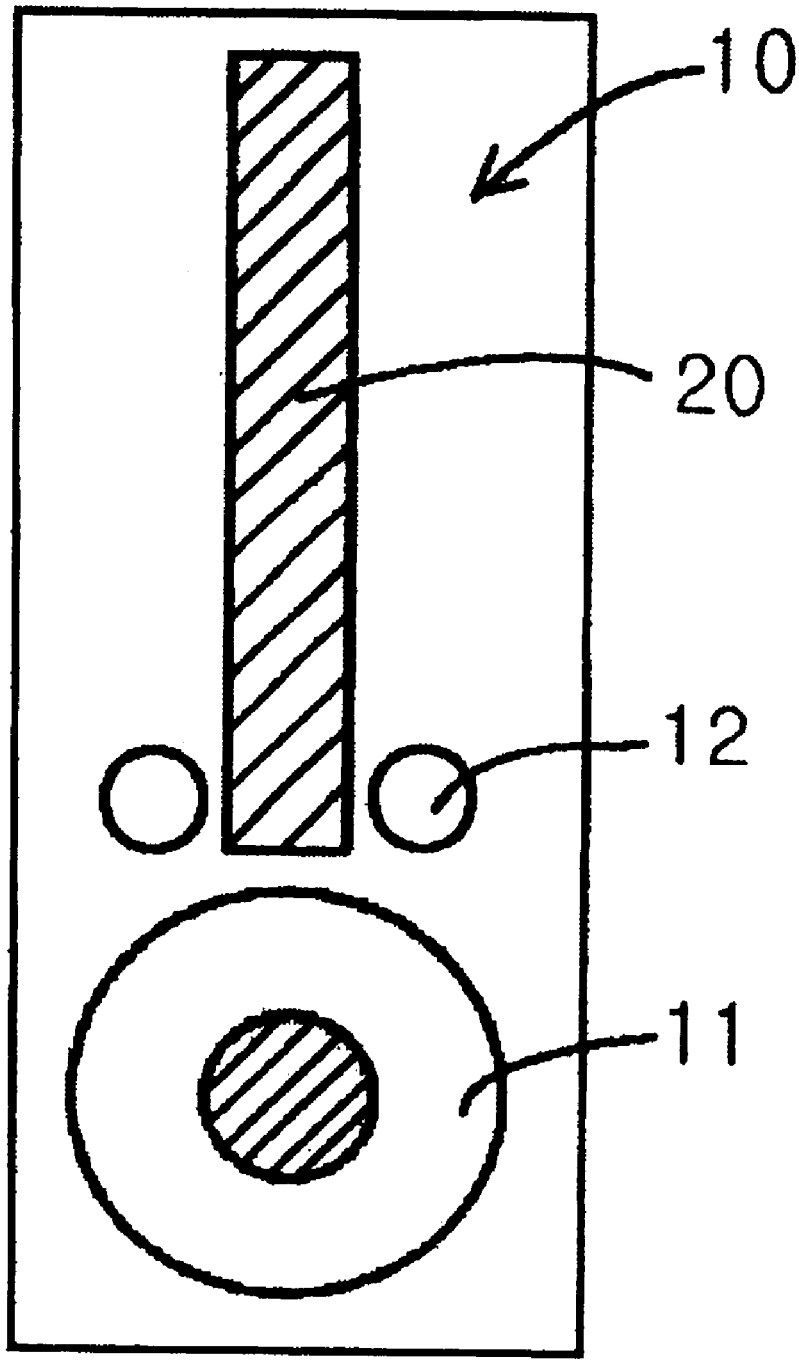
FIG. 2 is a side view of FIG. 1

FIG. 1 is a schematic view of a metal fiber-producing device according to the preferred embodiment of the present invention, and FIG. 2 is a side view of FIG. 1.

The metal fiber producing apparatus according to the preferred embodiment of the present invention includes a rectangular frame 10, two induction coils 12 disposed horizontally in the inside of the frame 10 and a rotary disk 11 disposed horizontally at a lower portion of the induction coils 12.

The frame 10 is in a sealed structure and thereby metal fiber can be produced in a vacuum condition. The frame 10 may be filled with inert gas, such as argon or helium instead of the vacuum condition. The induction coils 12 are horizontally disposed at an interval in the inside of the frame 10. A metal plate 20 is dropped into a space between the induction coils 12 and then melted with heat generated by the induction coils 12 while passing between the induction coils 12. The rotary disk 11 rotating in a high speed is horizontally disposed at the lower portion of the induction coils 12. The rotary disk 11 has a plurality of blades formed vertically on a round bar, and the metal plate 20 dropped vertically is brought into contact with the blades of the rotary disk 11 and thereby extracted into a fiber form.

A method for producing metal fiber according to the preferred embodiment of the present invention includes steps of: making the frame 10 in a vacuum conduction by removing the air, dropping the metal plate 20 between the induction coils 12 and heating and melting an end of the metal plate 20 with heat generated by the induction coils 12; and bringing the end of the metal plate 20 into contact with the blades of the rotary disk 11 by moving the metal plate 20 gradually downward and separating and solidifying metal fiber.

In the step of making the frame 10 in the vacuum condition by removing the air, it is preferable that the pressure in the vacuum condition is $10^{-1}$~$10^{-3}$ atm. The frame 10 may be filled with inert gas, such as argon or helium instead of the vacuum condition. In this case, an oxidation of the metal fiber in a high temperature can be prevented.

Preferably, a thickness of the metal plate 20 is about 2~15 mm, but may be adjusted according to materials of the metal plate 20. It is preferable that a heating temperature of the induction coils 12 is about 1,000~1700° C., but it also may be adjusted according to the materials of the metal plate 20. A rotational speed of the rotary disk 11 is about 3,000~5,000 rpm.

The metal fiber extracted by the blades of the rotary disk 11 is cooled and solidified. At this time, a cooling speed of the metal fiber is about 1,000~100,000° C./sec. The rotary disk 11 is water-cooled. The extracted metal fiber is about 15 μm~500 μm and it may be adjusted according to uses.

In the present invention, not a metal bar but the metal plate is used to extract the metal fiber and thereby production efficiency of the metal fiber is increased. Especially, the production efficiency of the metal fiber to power consumption is very increased, and manufacturing equipments are simplified.

While the present invention has been described with reference to the particular illustrative embodiments, it is not to be restricted by the embodiments but only by the appended claims. It is to be appreciated by those skilled in the art can change or modify the embodiments without departing from the scope and spirit of the present invention.

I claim:

1. A method for producing metal fiber, the method comprising steps of:

making a frame in a vacuum condition by removing the air;

vertically inserting an end of a single metal plate between two induction coils arranged horizontally at an interval in the inside of the frame and heating and melting the end of the metal plate with heat generated by the induction coils;

gradually moving the single metal plate downwardly and bringing the end of the metal plate into contact with blades of a rotary disk, the rotary disk being horizontally mounted at a lower portion of the induction coils in the inside of the frame and rotating at a high speed; and solidifying metal fiber separated from the blades of the rotary disk.

2. The method as claimed in claim 1, wherein an inside pressure of the frame is $10^{-1}$~$10^{-3}$ atm.

3. The method as claimed in claim 1, wherein the frame is filled with inert gas, such as argon or helium after removing the air.

4. The method is claimed in claim 1, wherein a heating temperature of the induction coils is 1,000~1,700° C.

5. The method as claimed in claim 1, wherein the rotary disk is water-cooled and a wherein the rotational speed of the rotary disk is 3,000~5,000 rpm.

6. The method as claimed in claim 1, wherein a cooling speed of the metal fiber is 1,000~10,000° C./sec., and [a] wherein the thickness of the metal fiber is 15 μm~500 μm.

7. An apparatus for producing metal fiber, comprising: a frame;

two induction *c*oils mounted horizontally at an interval in the inside of the frame, each induction coil heating a single metal plate dropped vertically between the induction coils *i*n a controlled manner by a single *p*late feed controller; and a rotary disk having a plurality of blades formed on a round bar at regular intervals, the rotary disk being horizontally mounted at a lower portion of the induction coil in the inside of the frame, the rotary disk rotating at a high speed to separate metal fiber from the blades of the rotary disk.

* * * * *